(12) United States Patent
Giacomuzzo

(10) Patent No.: US 6,186,623 B1
(45) Date of Patent: Feb. 13, 2001

(54) FRONT PIECE OF SPECTACLES FOR ACCOMMODATING INTERCHANGEABLE LENSES

(75) Inventor: Giuseppe Giacomuzzo, Longarone (IT)

(73) Assignee: Galvision S.r.l., Longarone (IT)

( * ) Notice: Under 35 U.S.C. 154(b), the term of this patent shall be extended for 0 days.

(21) Appl. No.: 09/349,265

(22) Filed: Jul. 7, 1999

(51) Int. Cl.⁷ ...................................................... G02C 1/04
(52) U.S. Cl. .............................. 351/106; 351/85; 351/86; 351/103
(58) Field of Search .................................. 351/85, 83, 41, 351/86, 103, 106

(56) References Cited

U.S. PATENT DOCUMENTS 2,781,693 * 2/1957 Brumby ................................. 351/85

* cited by examiner

Primary Examiner—Hung Xuan Dang
(74) Attorney, Agent, or Firm—Bucknam and Archer

(57) ABSTRACT

There is provided a front piece for spectacles, particularly protective spectacles and sport goggles, the front piece for spectacles being adapted for commercialization with a kit of interchangeable lenses in order to adapt for many uses of the spectacles. The front piece for spectacles includes a pair of adjoining rims each formed of inner and outer lateral sides and an interconnecting lower arch having a groove formed in the lateral sides and lower arch for receiving a corresponding lens. The groove is interrupted by a locking pip so that upon bending the front piece slightly a lens can be removed or inserted by articulation with the locking pip. An upper arch is disposed between the lateral sides of the rim and adjacent the plane defined by the groove in the lateral sides and lower arch of the rim. The upper arch may have a design in the form of writing, etc. in relief so as to aerate the lens.

7 Claims, 1 Drawing Sheet

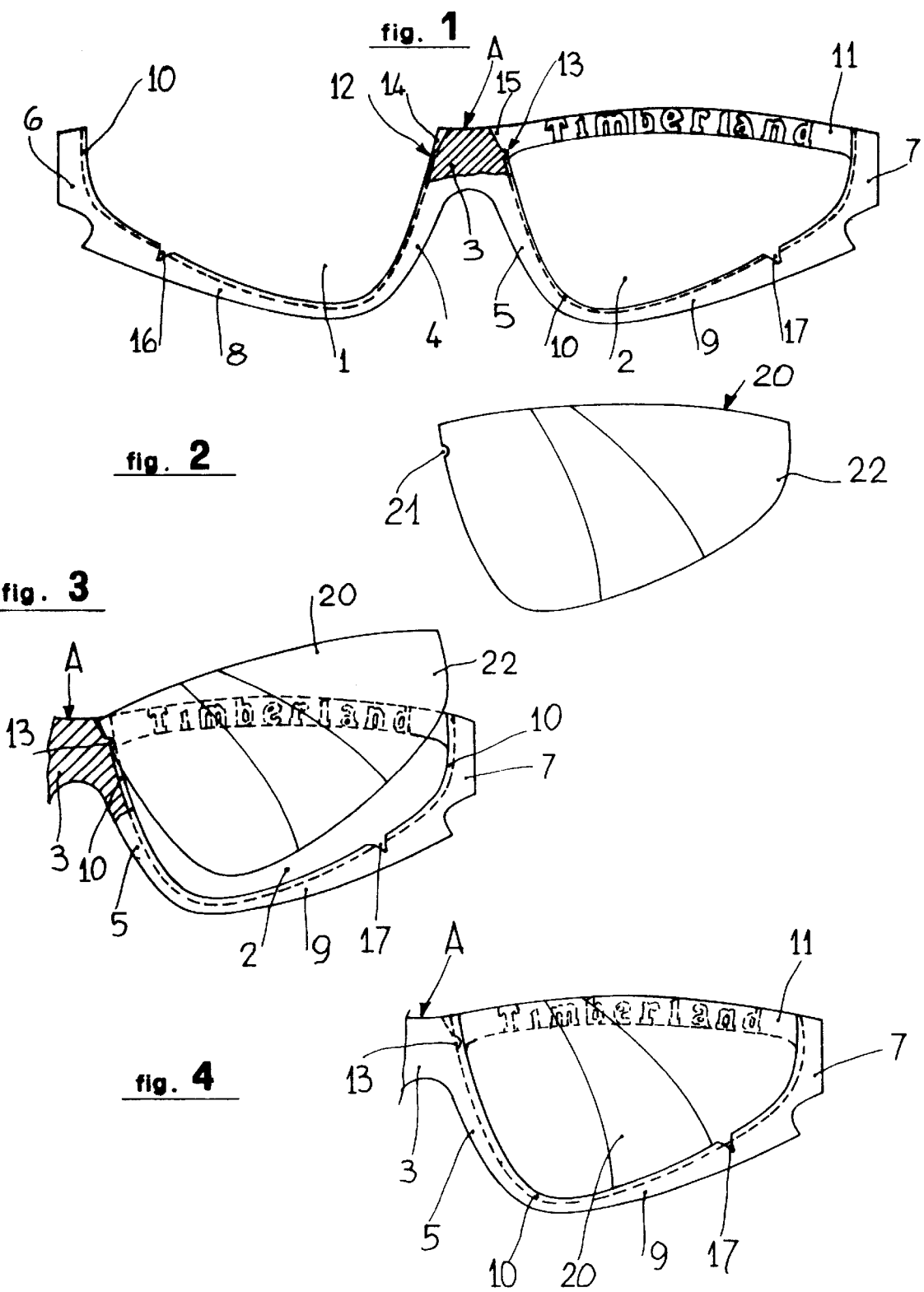

FRONT PIECE OF SPECTACLES FOR ACCOMMODATING INTERCHANGEABLE LENSES

BACKGROUND OF THE INVENTION

1. Field of the Invention

This invention deals with a new constructive form of a front piece of spectacles, particularly of protective spectacles and sport goggles, said front piece being supposed to be commercialized with a series of interchangeable lenses in order to fit every kind of use of the spectacles.

Main feature of this invention is that of presenting a front piece of spectacles equipped with flexible housings for the lenses, said housing being pocket-shaped and accomplished on three sides of every rim with the exception of one arch of rim, which usually is the upper one, said housings being also provided with a locking pip, so that under proper strain a side of the eyelet of the front piece bends lightly, so that a lens can be inserted or removed after being articulated on the locking or stopping pip, one side of the rim, which usually is the upper one, being without bevelling for the housings, so that writings in relief can be accomplished on it, said writings having not only an aesthetic purpose but also a functional one, aerating the lenses.

2. Description of the Related Art

Spectacles do not only have a therapeutic or ophthalmic purpose but they also protect from the sun rays or from other causes of dazzling and from impurities or sparks during particular work activities.

Among the protective spectacles there are some for a specific use. For example there are spectacles for welders or for skiers and there are spectacles for a mixed or changeable use, still presenting a function of protection from the sun rays or from other sources that can irritate the eyes.

In this field many designes for spectacles have been realized and, to satisfy different necessities, the lenses have been made interchangeable in order to apply the most proper one for the specific situation.

The prior art is usually based on frames having a fixed front piece, on which the different kinds of lenses can be applied or removed by means of screws or clips, which fix the lenses to the front piece according to a technique that reveals itself very uneasy for the user, who usually is unexperienced and has not the proper instruments.

According to other constructive solutions of this kind of spectacles mask lenses have been accomplished, on whose edges lateral hinging elements for the side pieces and central elements for the nosepiece are applied, but also this solutions are troublesome in case of replacement of a mask with another one more proper for the new situation.

According to a further technique, front pieces of spectacles have been accomplished in flexible material, so that the lenses can be inserted or removed by means of a light strain applied on the whole structure of the front piece. Also this technique reveals itself disadvantageous, since the uniform flexibility of the front piece determines an easy disengagement of the lenses whenever an occasional strain acts on the spectacles.

The above mentioned prior art of protective spectacles presents so many disadvantages and drawbacks that the user usually wears the spectacles as they have been given to him without exploiting their supposed versatility.

BRIEF SUMMARY OF THE INVENTION

Object of this invention is that of accomplishing a front piece of spectacles that allows an effective and lasting use of the interchangeable lenses given with the spectacles, making the possibility of changing the lenses for every specific necessity, protective or ophthalmic, easy, safe and enduring.

Other object of the invention is that of enabling the use of the same frame of spectacles both for protective lenses and for ophthalmic or sight lenses interchangeable with the former ones and, if necessary, treated for protective purposes.

Another object of the invention at issue is that of ensuring the maximum aeration of the lens, accomplishing a front piece of spectacles that does not present a side or arch of rim, which usually is the upper one, or accomplishing on said arch writings in relief giving a new aesthetic value to the lens and, above all assuring a proper aeration of the lens.

Further object of the invention is that of allowing the accomplishment of particular forms of front pieces and of frames for optical and protective spectacles.

BRIEF DESCRIPTION OF THE DRAWINGS

These and other purposes have been achieved with the device at issue, as it can be clearly inferred from the following description of a constructive solution, which is not limitative but given just by way of example and expounded with the help of the 4 drawings illustrated in the attached table, in which FIG. 1 shows an external vertical view of a front piece of spectacles, the rims of which are illustrated in two different constructive forms, both according to the proposed solution;

FIG. 2 shows an external vertical view of a lens to apply to one of the rims of the front piece of FIG. 1;

FIG. 3 shows vertical partial view of the front piece of FIG. 1, on which the lens of FIG. 2 is about to be applied;

FIG. 4 shows a partial vertical view of the front piece of FIG. 1, on which the lens of FIG. 2 have been applied.

In all figures the same particulars are represented or are understood as represented with the same number of reference.

DETAILED DESCRIPTION OF THE INVENTION

According to the constructive solution illustrated in the attached table, a front piece A is accomplished with a couple of rims 1 and 2 linked together by means of a nosepiece 3 and made up respectively of internal lateral sides 4–5, of external lateral sides 6–7 and of bottom sides or arches 8–9, said rims 1 and 2 having a groove or an internal bevelling 10 capable of housing the left lenses 20 and the specular right lenses not represented here, said lenses being previously shaped after the model of the rims 1 and 2.

An upper arch 11 can link the lateral sides 5–7 of the rim 2 or the sides 4–6 of the rim 1, said arch lying behind the plane of the groove 10, so that said groove 10 forms a pocket to house the lens 20 on the sides 4–6–8 and/or 5–7–9 according to technique below described.

On the internal sides 4 and 5 of the nosepiece 3 the groove 10 is interrupted by a pip 12 and 13 and by the final subsequent flares 14 and 15, the depth plane of which can coincide with the upper surface of the arch 11.

Said groove 10 on the sides 6 and 7 presents a final piece with a lightly re-entering bending and approximately with the radius centered on the corresponding pips 12 and 13 in order to fix the lens 20 here placed Another feature of the front piece according to the present invention is that of presenting some cuts 16 and 17, which give to the external sides 6 and 7 a proper flexibility during the insertion or removal of the left lens 20 and of its specular right lens.

Furthermore, in case the upper arch 11 is present, the front piece at issue gives the possibility of accomplishing writings in relief, like the one given by way of example, or drawings or particular marks made in relief, said writings assuring both an aesthetic effect and the circulation of air in the upper part of the lens, which is the most sensitive to the temperature of the user.

The left lens 20 as well as its specular right lens is accomplished in the form of the chosen model in order to be applied to the front piece A, while its dimensions correspond to the dimensions of the milling 10 made on the eyelets 1 and 2.

Said lens 20 as well as its specular are also equipped with a cut 21 placed in such a position that it can be linked to the pip 12 and/or 13 of the front piece A, while its external side 22 presents preferably a bending having the radius centered on the axis of the above mentioned cut 21, in order to achieve the best connection of the lens itself.

After having described the main elements of the invention, their functioning is below described, according to what is illustrated in the FIGS. 3 and 4, so as to verify the conformity with the above mentioned objects of the invention.

From FIG. 3 it can be inferred that, to apply the lens 20 to the eyelet 2, the pip 13 of the groove 10 must be housed in the seat 21 of the lens 20 itself.

The lens 20, articulated on the pip 13, is so rotated that its external side 22 places itself into the groove 10 of the side 7.

At the same time the side 7 opens a little thanks to the elasticity given by the cut 17, so as to facilitate the housing of the whole lens 20 in the seat of the milling 10 of the eyelet 2, as it is illustrated in FIG. 4.

Coming the opening movement of the side 7 to an end, said side 7 closes completely on the side 22 of the lens 20, which is so blocked in the wished position, said lens being imprisoned by the pip 13.

Being the end 22 of the lens 20 and the end of the milling 10 on the external side 7 reentering thanks to their bending with the co-axial radius centered on the pip 13 and/or on the cut 21, a tapering is performed in order to prevent the lens 20 from coming out of its housing pocket formed by the milling 10 on the three sides 5–7 and 9.

The same procedure is used for the fixing of the specular lens in the eyelet 1, apart from the presence of the upper arch 11.

Thanks to this easy and efficacious procedure the best conditions for a quick application of the lenses 20 are assured, according to one of the above mentioned objects of the invention.

It is clear that the removal and replacement of the lenses 20 is achieved thanks to the same but reversed procedure, which allows a quick and easy replacement of the protective or optical lenses in relation to the change of the user's necessities without the help of any specific instruments or without having any specific experience in this field.

The existing technique can produce optical or sight lenses treated to have also protective qualities. With this invention the series of lenses give with the only frame for spectacles A can be made up also of optical lenses made protective for specific and different necessities, said lenses being fit to be applied to the same frame A, according to another object of the invention.

The constructive form hitherto described is not limitative but given just as way of example. As a matter of fact, similar front piece for spectacles can been accomplished both in acetate and in other plastic material, with or without the upper archs 11 placed on the bottom of the structure or placed with free internal side.

It is also possible to accomplish a front piece for spectacles made up of eyelets, everyone of which presents one or more cuts 16–17. It is also possible to apply parts of rims 1 and 2, eliminating the cuts and replacing them with one or more hinges or elastic joints to link the different pieces of the rim.

Furthermore the eyelets 1 and 2 and the corresponding lenses can be accomplished in every form and dimension, according to the chosen model.

These and other adjustments and variations are however understood as belonging to the originality of the invention to protect.

What is claimed is:

1. A front piece for spectacles comprising:

first and second rims adapted to receive for mounting therein corresponding lenses, said rims being linked together by a nose piece and each being formed by an inner lateral side and an outer lateral side interconnected by a lower arch;

a groove formed in the lateral sides and lower arch of each rim for retaining therein a circumferential edge of the corresponding lens;

a pip formed in said groove near said nose piece followed by a final inwardly directed flare; and a cut formed in each rim so as to render said rim sufficiently flexible to permit the removal or mounting of the corresponding lens.

2. The front piece for spectacles as defined in claim 1, wherein said cut formed in each rim is positioned near the interconnection of a lateral side with said lower arch.

3. The front piece for spectacles as defined in claim 2, wherein the front piece is formed of any suitable material and further includes hinges to allow the rims to open and close elastically.

4. The front piece for spectacles as defined in claim 3, wherein the outer lateral side of each rim is formed with a bending arch whose radius is centered on the corresponding pip and the end thereof is tapered inwardly so that the corresponding lens when mounted therein is firmly held.

5. The front piece for spectacles as defined in claim 4, wherein each lens corresponding to the first and second rims has a circumferential edge whose form corresponds to the groove formed in the lateral sides and lower arch of said rims.

6. The front piece for spectacles as defined in claim 5, wherein a cut is formed on the circumferential edge of each lens corresponding to the pip formed in the groove in the corresponding rim whereby said lens cut is linked with said pip, and an external side of each lens forms a bending whose radius is centered on the corresponding cut in said lens.

7. The front piece for spectacles as defined in claim 1, which further comprises an upper arch having an external surface arranged behind a plane defined by the groove formed in the lateral sides and lower arch of each rim and which is disposed between the lateral sides of the rim, the external surface of said upper arch having a design thereon in relief so as to lift the circumferential edge of said lenses to thereby permit aeration thereof.

\* \* \* \* \*